United States Patent
Mont-Reynaud

(10) Patent No.: US 10,410,635 B2
(45) Date of Patent: Sep. 10, 2019

(54) DUAL MODE SPEECH RECOGNITION

(71) Applicant: SoundHound, Inc., Santa Clara, CA (US)

(72) Inventor: Bernard Mont-Reynaud, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 15/619,304

(22) Filed: Jun. 9, 2017

(65) Prior Publication Data
US 2018/0358019 A1    Dec. 13, 2018

(51) Int. Cl.
| | |
|---|---|
| *G10L 15/22* | (2006.01) |
| *G10L 15/02* | (2006.01) |
| *G10L 15/00* | (2013.01) |
| *G10L 15/32* | (2013.01) |
| *G10L 15/06* | (2013.01) |
| *G10L 15/30* | (2013.01) |
| *G10L 15/18* | (2013.01) |

(52) U.S. Cl.
CPC .............. *G10L 15/32* (2013.01); *G10L 15/02* (2013.01); *G10L 15/063* (2013.01); *G10L 15/1822* (2013.01); *G10L 15/30* (2013.01); *G10L 2015/0635* (2013.01)

(58) Field of Classification Search
CPC .......... G10L 15/06; G10L 15/20; G10L 21/00
See application file for complete search history.

(56) References Cited

U.S. PATENT DOCUMENTS

| | | |
|---|---|---|
| 5,956,683 A | 9/1999 | Jacobs et al. |
| 6,327,568 B1 | 12/2001 | Joost |
| 6,377,913 B1 | 4/2002 | Coffman et al. |

(Continued)

FOREIGN PATENT DOCUMENTS

| | | |
|---|---|---|
| EP | 2930716 A1 | 10/2015 |
| WO | 2016209444 A1 | 12/2016 |

OTHER PUBLICATIONS

Javier Gonzalez-Dominguez, et al., A Real-Time End-to-End Multilingual Speech Recognition Architecture, IEEE Journal of Selected Topics in Signal Processing, Jun. 2015, vol. 9, No. 4, IEEE.

(Continued)

*Primary Examiner* — Shreyans A Patel
(74) *Attorney, Agent, or Firm* — Haynes Beffel & Wolfeld LLP; Ernest J. Beffel, Jr.; Andrew L. Dunlap

(57) ABSTRACT

A dual mode speech recognition system sends speech to two or more speech recognizers. If a first recognition result is received, whose recognition score exceeds a high threshold, the first result is selected without waiting for another result. If the score is below a low threshold, the first result is ignored. At intermediate values of recognition scores, a timeout duration is dynamically determined as a function of the recognition score. The timeout duration determines how long the system will wait for another result. Many functions of the recognition score are possible, but timeout durations generally decrease as scores increase. When receiving a second recognition score before the timeout occurs, a comparison based on recognition scores determines whether the first result or the second result is the basis for creating a response.

23 Claims, 18 Drawing Sheets

(56) References Cited

U.S. PATENT DOCUMENTS

| | | | |
|---|---|---|---|
| 6,408,272 | B1 | 6/2002 | White et al. |
| 6,456,975 | B1 | 9/2002 | Chang |
| 6,487,534 | B1 | 11/2002 | Thelen et al. |
| 6,697,782 | B1* | 2/2004 | Iso-Sipila ............... G10L 15/08 704/275 |
| 6,701,294 | B1 | 3/2004 | Ball et al. |
| 6,704,708 | B1 | 3/2004 | Pickering |
| 7,058,573 | B1* | 6/2006 | Murveit ................ G10L 15/08 704/229 |
| 7,277,854 | B2 | 10/2007 | Bennett et al. |
| 7,472,060 | B1 | 12/2008 | Gorin et al. |
| 8,521,526 | B1* | 8/2013 | Lloyd .................. G10L 15/197 704/236 |
| 8,949,130 | B2* | 2/2015 | Phillips ................. G10L 15/30 382/190 |
| 8,972,263 | B2 | 3/2015 | Stonehocker et al. |
| 9,330,669 | B2 | 5/2016 | Stonehocker et al. |
| 9,678,928 | B1* | 6/2017 | Tung .................. G06F 17/2247 |
| 9,691,390 | B2 | 6/2017 | Stonehocker et al. |
| 2002/0198706 | A1 | 12/2002 | Kao et al. |
| 2004/0210437 | A1 | 10/2004 | Baker |
| 2005/0010422 | A1* | 1/2005 | Ikeda ...................... G10L 15/30 704/277 |
| 2006/0009980 | A1* | 1/2006 | Burke .................... G10L 15/30 704/270 |
| 2006/0036438 | A1 | 2/2006 | Chang |
| 2006/0190256 | A1 | 8/2006 | Stephanick et al. |
| 2006/0190268 | A1 | 8/2006 | Wang |
| 2007/0011010 | A1 | 1/2007 | Dow et al. |
| 2007/0276651 | A1 | 11/2007 | Bliss et al. |
| 2010/0057451 | A1* | 3/2010 | Carraux .................. G10L 15/30 704/231 |
| 2010/0106497 | A1 | 4/2010 | Phillips |
| 2011/0015928 | A1 | 1/2011 | Odell et al. |
| 2012/0022874 | A1 | 1/2012 | Lloyd et al. |
| 2012/0150539 | A1* | 6/2012 | Jeon ...................... G10L 15/065 704/236 |
| 2012/0179457 | A1 | 7/2012 | Newman et al. |
| 2013/0085753 | A1* | 4/2013 | Bringert ................. G10L 15/32 704/233 |
| 2013/0132084 | A1* | 5/2013 | Stonehocker ........... G10L 15/30 704/244 |
| 2014/0163977 | A1* | 6/2014 | Hoffmeister ............ G10L 15/32 704/232 |
| 2014/0250378 | A1* | 9/2014 | Stifelman ............... G10L 15/22 715/708 |
| 2014/0372122 | A1* | 12/2014 | Harsham ................ G10L 15/22 704/257 |
| 2016/0217788 | A1 | 7/2016 | Stonehocker et al. |
| 2017/0069308 | A1* | 3/2017 | Aleksic .................. G10L 15/04 |
| 2017/0178623 | A1* | 6/2017 | Shamir ................... G10L 15/04 |

OTHER PUBLICATIONS

Takuma Okamoto, et al., Reducing latency for language identification based on large-vocabulary continuous speech recognition, Acoust. Sci. & Tech., 2017, pp. 38-41, vol. 38, Issue 1, The Acoustical Society of Japan.

EP18177044.7—Extended Euorpean Search Report dated Aug. 18, 2018, 7 pages.

U.S. Appl. No. 13/530,101—Office Action dated Mar. 26, 2014, 8 pages.

U.S. Appl. No. 13/530,101—Response to Mar. 26 Office Action filed Sep. 23, 2014, 11 pages.

U.S. Appl. No. 13/530,101—Notice of Allowance dated Oct. 24, 2014, 8 pages.

U.S. Appl. No. 14/621,024—Office Action dated Aug. 26, 2015, 10 pages.

U.S. Appl. No. 14/621,024—Response to Aug. 26 Office Action filed Nov. 13, 2016, 5 pages.

U.S. Appl. No. 14/621,024—Notice of Allowance dated Jan. 5, 2016, 9 pages.

U.S. Appl. No. 15/085,944—Office Action dated Nov. 16, 2016, 11 pages.

U.S. Appl. No. 15/085,944—Notice of Allowance dated Feb. 24, 2016, 10 pages.

U.S. Appl. No. 15/603,257—Nonfinal Office Action dated Jun. 8, 2018, 20 pgs.

U.S. Appl. No. 15/603,257—Response to Nonfinal Office Action dated Jun. 8, 2018, filed Sep. 5, 2018, 11 pgs.

U.S. Appl. No. 15/603,257—Final Office Action dated Sep. 25, 2018, 13 pgs.

U.S. Appl. No. 15/603,257—Response to Final Office Action dated Sep. 25, 2018, filed Apr. 3, 2019, 9 pgs.

* cited by examiner

DUAL MODE SPEECH RECOGNITION

FIELD OF THE INVENTION

The present invention is in the field of automated speech recognition (ASR), and, more specifically, use of multiple recognizers.

BACKGROUND

An objective of some speech recognition systems is to perform recognition as accurately as possible. An objective of some speech recognition systems is to respond with the most useful possible results. An objective of some speech recognition systems is to respond robustly in environments with failure-prone connections. An objective of some speech recognition systems is to distribute the processing workload between computer processors or geographical locations such as server farms.

Those objectives, in many embodiments, conflict with another key objective, which is to respond to users with useful results as quickly as possible. That is, with low latency. Dual mode speech recognition systems and methods use multiple recognizers to convert speech into useful results. Known embodiments of dual mode speech recognition attempt to address the conflicting objectives by sending speech to multiple recognizers varying in speed and accuracy, and provide low latency by setting up a timeout and choosing among the results, if any, that are received before the timeout occurs.

This approach has a major drawback, which is that, in some instances, the user will receive no response until the timeout occurs. That is, he must wait for as long as the longest amount of time the system is designed to wait for any response. Furthermore, in no case will the system respond before receiving a second result, even if the first result is of sufficient quality.

SUMMARY OF THE INVENTION

The present disclosure is directed to embodiments of systems, methods, and non-transitory computer readable media that perform dual mode speech recognition. Various embodiments respond to user speech immediately if a result is of sufficient quality. Quality is measured by a recognition score. Various embodiments respond early if the first result is useful, as measured by the quality score, and vary the latency as a function of the quality of the result. Various embodiments use timeout events whose duration varies with quality: a low quality result suggests waiting longer for a higher quality result. Various embodiments ignore early results if they are below an acceptable level of quality, and respond with a later result or an error if no second result is received before a timeout occurs.

Some embodiments have asymmetrical recognizers, such as one that responds more quickly and one that responds with more accurate or more useful results. For example, some mobile phones perform speech recognition both locally and over a wireless Internet connection. Some earpiece headsets perform speech recognition in the headset, but also in a phone connected over a personal area network.

Some embodiments are Internet-connected automobiles that respond, if possible from a remote server, which has access to useful dynamic data such as weather and traffic conditions, but responds from a local recognizer when the automobile is in a location that has no wireless network connectivity.

Some embodiments are power-sensitive systems-on-chip that use low power processors for recognition in a typical mode, but wake up a high performance processor if needed to provide better results.

Some embodiments use server-based dual mode recognition, and send speech to more than one server with symmetrical recognizers that have different ping latencies or different presence of local data.

Some embodiments send speech to multiple remote recognizers if accessing different recognizers incur different costs. In such case, it may be advantageous to send spoken utterances to the less expensive one, compare a resulting recognition score to a threshold, and, if the recognition score is below the threshold, send the spoken utterance to a second recognizer.

Some embodiments perform recognition on delimited spoken queries, such as the speech between a detected wake-up phrase and a detected end-of-utterance. Some embodiments perform recognition continuously, typically at periodic intervals called frames, such as every 10 msec. Some embodiments perform speech recognition incrementally.

Various embodiments quantify the quality of results using various appropriate techniques. As part of speech recognition, some embodiments compute hypotheses and probability scores for phonemes, phonetic sequences, word sequences (transcriptions), grammatically correct sentences (parses), and meaningful interpretations. Recognition scores, in various embodiments, are based on a probability score alone or a combination of such probability scores.

DETAILED DESCRIPTION

Terminology as Used Herein

Spoken utterances are delimited segments of speech, typically comprising multiple words. In various embodiments, they are initiated by a wake-up phrase or a UI action such as clicking or tapping, and terminated by detection of an end-of-utterance event or a UI action such as tapping or releasing a button.

Recognizers are hardware- or software-implemented subsystems, which receive speech and return recognition results with associated scores. The form and the nature of results varies widely across embodiments, but can include a text transcription, information requested by the speech, or representations of user intents, as data structures represented in JavaScript Object Notation (JSON) or other equivalent internal or exchange data format.

Various embodiments respond to users so as to give them a feeling that their speech has effected a desired result. Responses comprise results, but may include other information or actions as appropriate for various embodiments. For example, a spoken user request for a coffee causes a speech-enabled coffee maker to respond with spoken words and to produce a cup of coffee. Results are the basis for embodiments to produce responses. In some embodiments, results are text for a machine to output from a text-to-speech module. In some embodiments, results include text with mark-up meta information and instructions encoded for a machine to process.

Various recognizer embodiments associate recognition scores with results, and return the scores within results, or prior to results, depending on the embodiment. For example, the recognition score may be presented as included within the results or alternatively as separate from the results. Recognizers produce scores in various appropriate ways that practitioners of the embodiment know.

Local recognizers are ones present within devices with which users interact directly. Remote recognizers are ones that couple with user devices through means such as networks, cables, or wireless signaling.

The term timeout can refer to a period (i.e., duration) of time, a point in time, an event, or a stored value, as will be apparent to readers skilled in the art. Various embodiments start a timeout timer counting as soon as they send speech to a recognizer, start a timeout timer upon receiving a first score, or start a timeout timer at the time of any other event, as appropriate.

A function of a recognition score may be used to determine a timeout duration that is appropriate for a given recognition score. Some embodiments use discrete and some use continuous functions. For many embodiments, a non-increasing function is appropriate.

Various Embodiments

Figure 1:
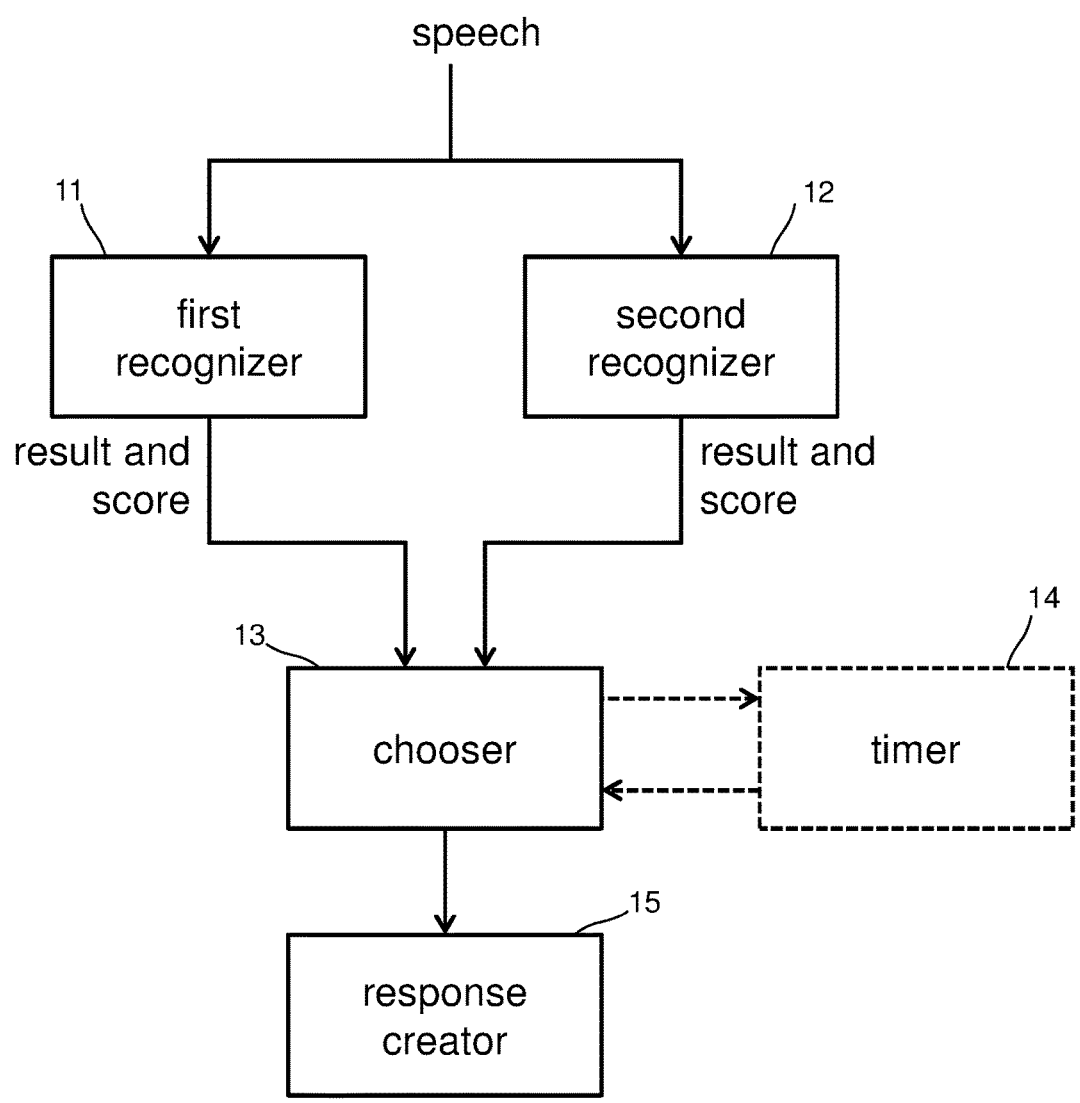
FIG. 1 illustrates components of a dual mode speech recognition system, according to some embodiments.

FIG. 1 shows components of a dual mode speech recognition system, according to an embodiment. Speech is received by a first recognizer 11 and a second recognizer 12. Each provides a result and a recognition score. A chooser 13 chooses the result of either the first recognizer or the second recognizer based at least on their associated scores. In some embodiments, chooser 13 also chooses the result from the first recognizer or the second recognizer based on when the results from each were received relative to a timeout event. In such an embodiment, a timeout value may be sent to timer 14, causing the timer to generate a timeout event at a point in time represented by the timeout value. For example, if a time duration is sent to timer 14, the timer may generate a timeout event at a time point determined by the current time plus the timeout value. If a time point is passed to the timer, the timer may generate a timeout event when the current time reaches the specified time point. In another embodiment, a timeout signal may be received by receiving an event notification from another element not determined based on time (and not shown in FIG. 1 The chooser 13 provides the chosen result to response creator 15, which uses the result as a basis for a response.

Figure 2A:
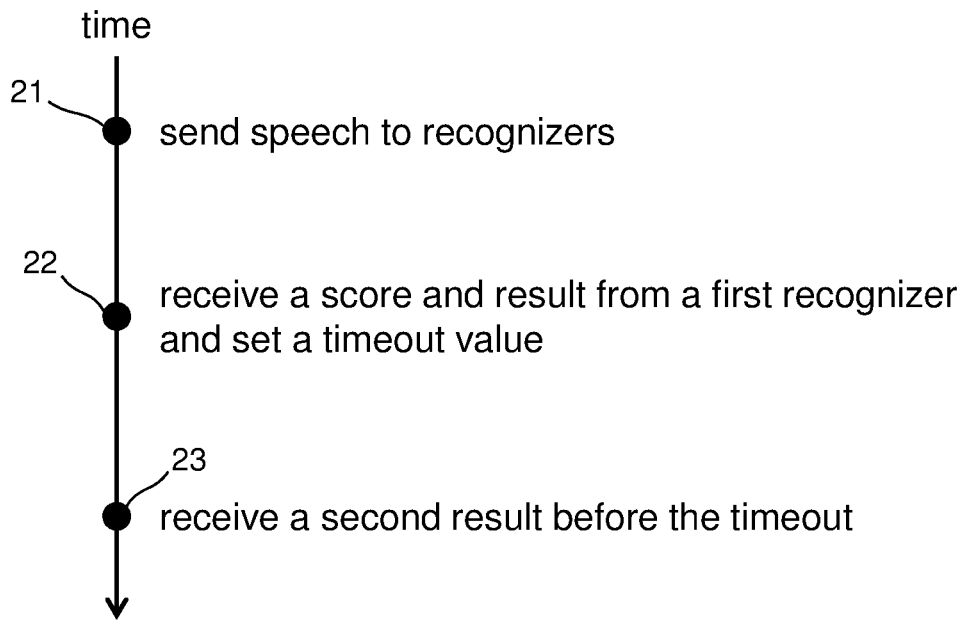
FIG. 2A illustrates a timeline of events for choosing between two results, according to some embodiments.
Figure 2B:
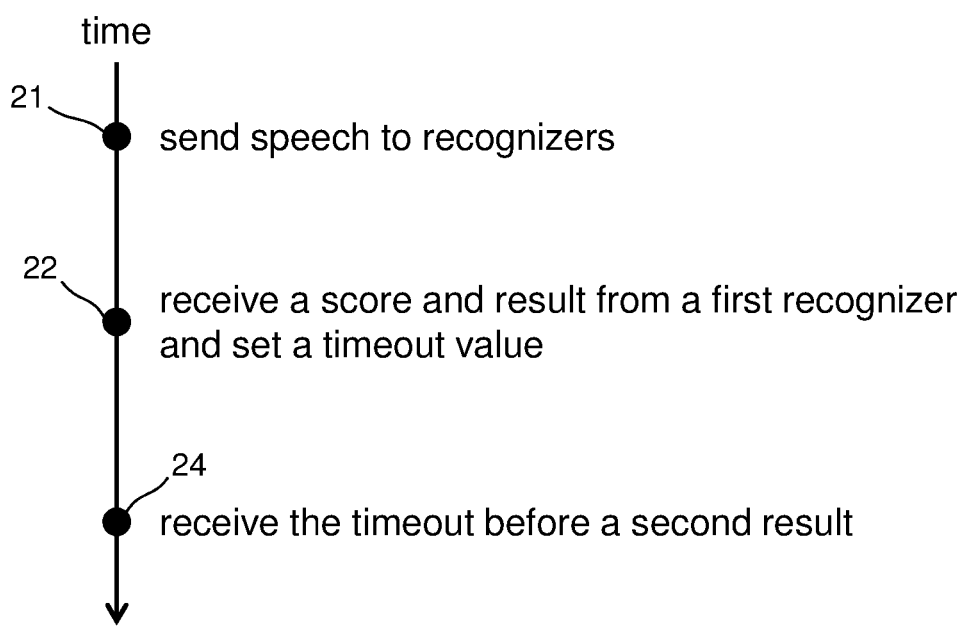
FIG. 2B illustrates a timeline of events for choosing a first result because of receiving a timeout before receiving a second result, according to some embodiments.

FIG. 2A shows a timeline of events that can occur in an embodiment. At time 21, a user device sends speech to a plurality of recognizers. At time 22, chooser 13 receives a score and result from a first recognizer and sets a timeout duration. At time 23, the chooser 13 receives a second result from the second recognizer before the timeout. Accordingly, the chooser 13 considers both results before making a choice for producing a response. FIG. 2B shows an alternative timeline of events. At time 24, the chooser 13 receives a timeout before a second result. Accordingly, the chooser 13 considers only the first result in order to produce a response.

Figure 3:
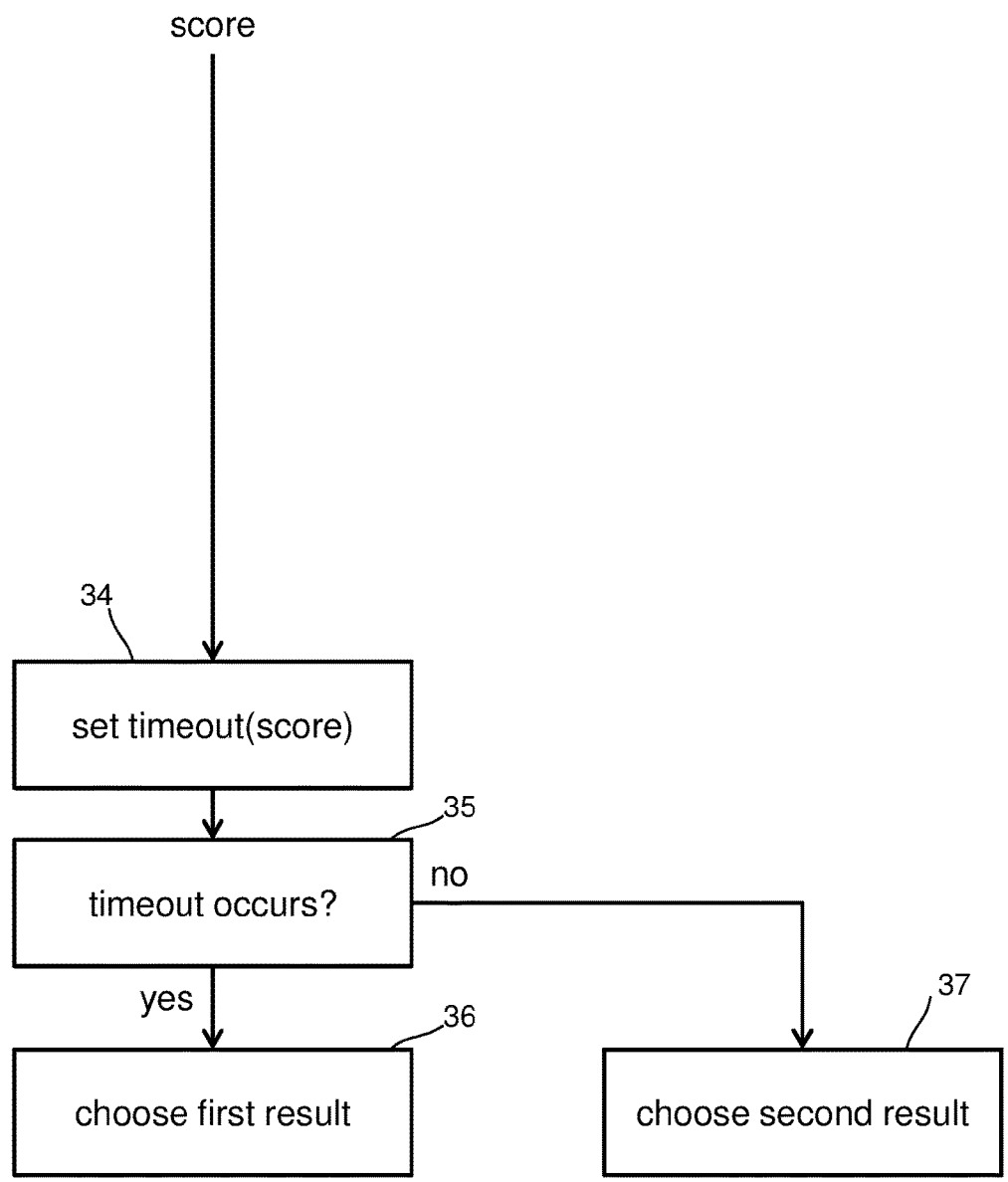
FIG. 3 illustrates choosing between a first and second result based on a set according to a first recognition score, according to some embodiments.

FIG. 3 shows an embodiment for choosing a first or second result. In some embodiment, the timeout duration may be preconfigured and the timer set before requests are sent to any recognizer. In FIG. 3, the incoming score is associated with a result received from a first recognizer. The request to the second recognizer may have been sent at the same time that the request to the first recognizer was sent or the request to the second recognizer may be sent after the score from the first recognizer is received. The timeout duration for waiting for a result and score from the second recognizer is set to a value depending on the score from the first recognizer. A reason for varying the timeout value for waiting for a result from the second recognizer is that the better the score received from the first recognizer, the lower the probability that the second recognizer will return a score that is higher, and thus, there is less motivation to wait a long time for a result and score from the second recognizer. Conversely, the lower the score received from the first recognizer, the greater the probability that the second recognizer will return a higher score, and thus, more patience in waiting for the second results is justified. Thus, the function for determining the timeout value may be inversely proportional to the score (when a higher number score indicates greater confidence in the result).

In the embodiment of FIG. 3 there is higher confidence in a result received from second recognizer than a result received from a first recognizer. The second recognizer may provide a more confident result because it has access to a larger database of vocabulary or utilize a more powerful recognition engine. Often, the first recognizer is local to a user's mobile device having relatively limited storage space and computation power as compared to a second recognizer located on a remote server.

In FIG. 3, the chooser receives a score and sets a timeout duration as a function of the score in Step 34. If the timeout occurs in Step 35 before receiving a second result, the embodiment chooses the first result in Step 36 as the basis for creating a response. Upon receiving a second result before the timeout occurs in Step 35, the embodiment presumes that the second result is superior to the first result and chooses it in Step 37. Such a presumption would be justified, for example, when a local recognizer produces results faster than a remote recognizer, but the results from the slower remote recognizer may be expected to be of higher quality than the local results.

Figure 4:
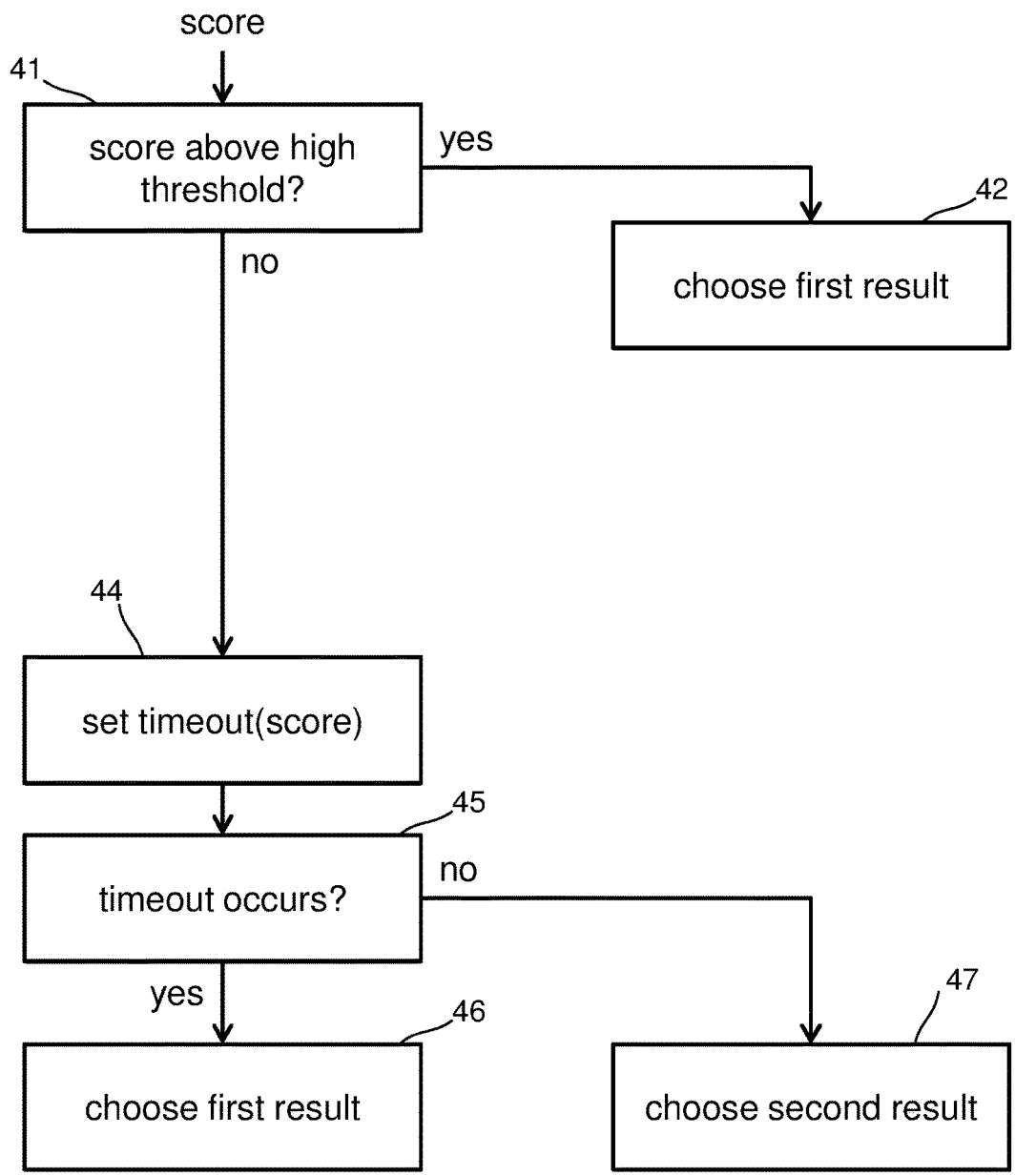
FIG. 4 illustrates choosing between a first and second result based on a set according to a first recognition score, but choosing the first result without waiting if the first score exceeds a threshold, according to some embodiments.

FIG. 4 shows an embodiment for choosing a first or second result. The embodiment illustrated in FIG. 4 differs from the embodiment in FIG. 3 as follows: if the score returned from the first recognizer indicates high enough confidence, then there is no need to request a result from the second recognizer. A threshold value may be configured which, when crossed, indicates that the chooser may use the result from the first recognizer without getting a second opinion from another recognizer. In the description herein, we assume that better confidence in the returned result is indicated by a relatively higher score (that is, a score with a greater number). However, a person of ordinary skill in the art will appreciate that if a lower score indicates greater confidence, then accordingly, the threshold to cross will be configured to be a lower number.

Upon receiving a first score, the chooser compares the first received score to a high threshold in Step 41. If the score is above the high threshold, the embodiment chooses in Step 42 a first result associated with the first score as the basis for creating a response, without waiting for another result. If the first score is not above the high threshold, the embodiment sets a timeout duration as a function of the first score in Step 44. Upon receiving a second result before the timeout occurs in Step 45, the embodiment presumes that the second result is superior to the first result and chooses it in Step 47. If the timeout occurs in Step 45 before receiving a second result, the embodiment chooses the first result in Step 46 as the basis for creating a response.

Figure 5:
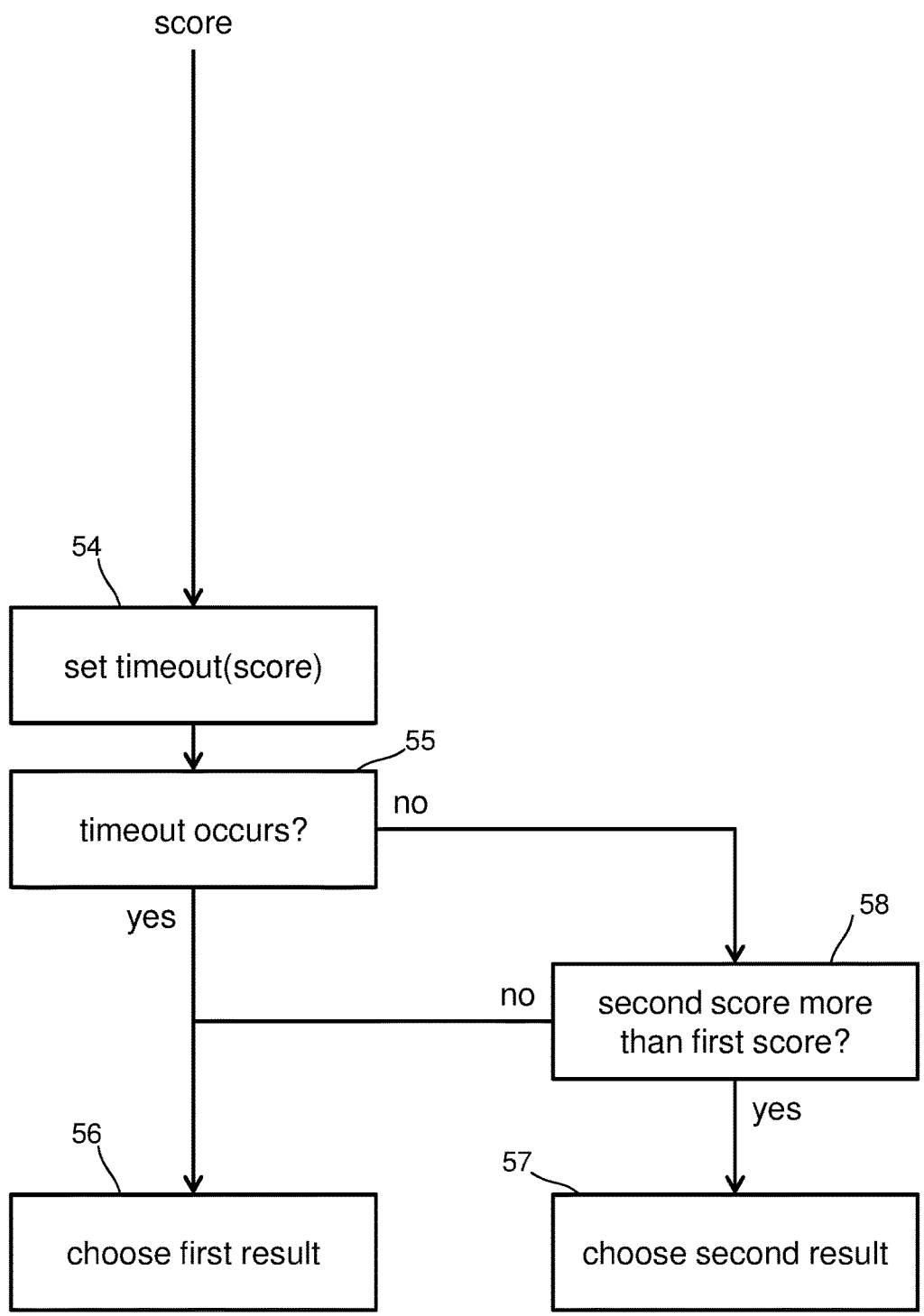
FIG. 5 illustrates choosing between a first and second result based on a set according to a first recognition score but choosing the higher scoring result if a second result is received before the timeout occurs, according to some embodiments.

FIG. 5 shows an embodiment for choosing a first or second result. The chooser receives a first score and sets a timeout duration as a function of the score in Step 54. If the timeout occurs in Step 55 before receiving a second result, the chooser chooses the first result in Step 56 as the basis for creating a response. Upon receiving a second score and result before the timeout occurs in Step 55, the chooser compares the second score to the first score in Step 58. If the second score is more than the first score, the chooser chooses the second result in Step 57 as the basis for creating a response. If the second score is not more than the first score in Step 58, the chooser chooses the first result in Step 56.

Figure 6:
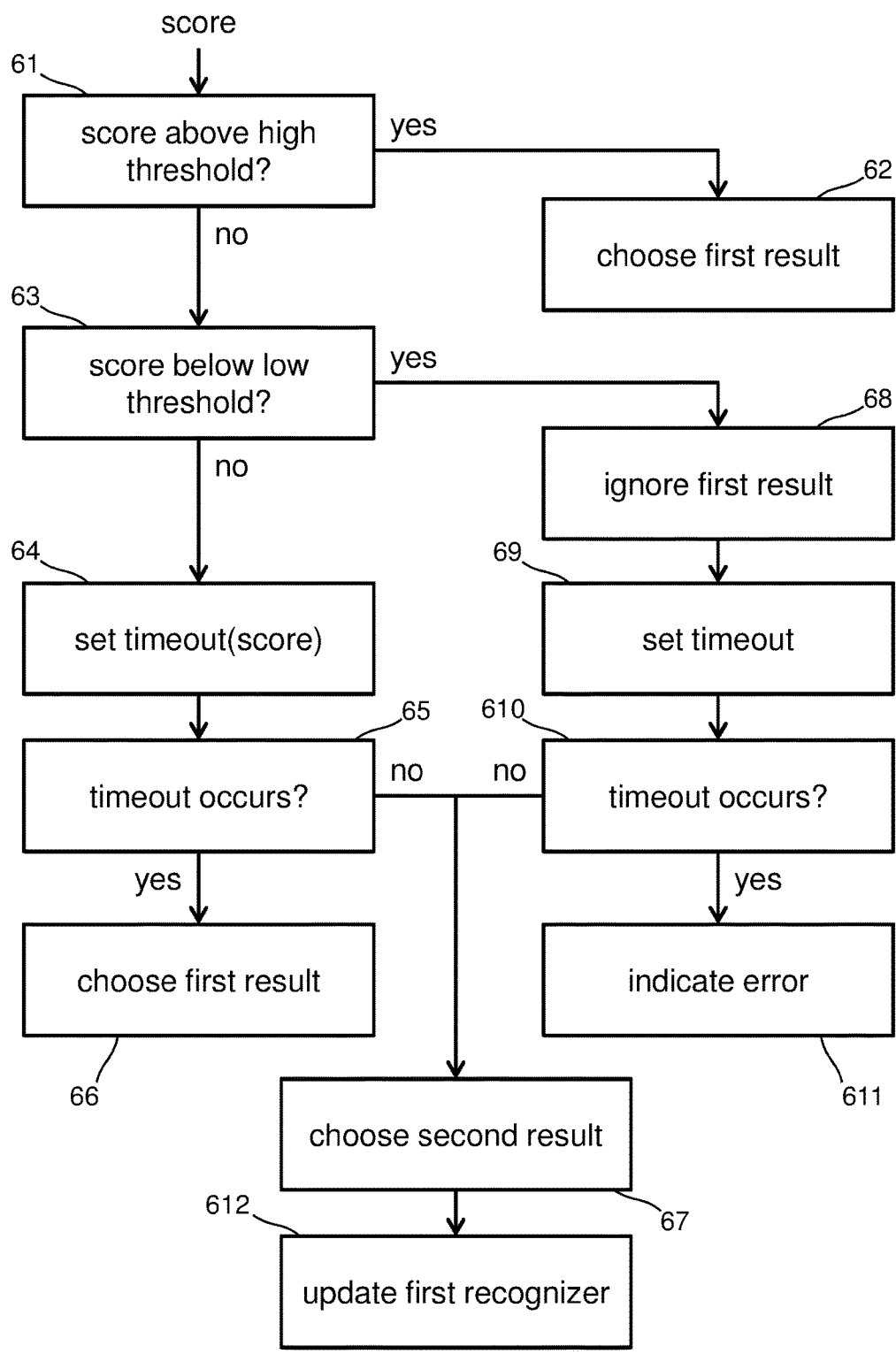
FIG. 6 illustrates choosing between a first and second result based on a set according to a first recognition score, but choosing the first result without waiting if the first score exceeds a high threshold or ignoring the first result if it is below a low threshold, as well as updating a first recognizer, according to some embodiments.

FIG. 6 shows an embodiment for choosing a first or second result. The embodiment illustrated in FIG. 6 determines how to proceed after receiving a score from the first recognizer by comparing the score to both a high threshold and a low threshold. The low threshold is used to determine if the score associated with the first result is so poor that the chooser will not use the first results under any circumstances. When the score is lower than the low threshold, the chooser has no confidence in the first result, and disregards the first result as a basis for creating the response.

Upon receiving a score associated with a first result, the chooser compares the score to a high threshold in Step 61. If the score is above the high threshold, the chooser chooses the first result as the basis for creating a response in Step 62 without waiting for a response from the second recognizer, or in some embodiments even without requesting such a response,.

If the score is not above the high threshold in Step 61, the chooser compares the score to a low threshold in Step 63. If the score is not below the low threshold in Step 63, the chooser sets a timeout duration as a function of the score in Step 64. When the score is between the low and high thresholds, the corresponding result may be considered as the basis for the response depending on the score received for results from the second recognizer, if results are received from the second recognizer before the timeout. Upon receiving a second result before the timeout occurs in Step 65, the chooser chooses assumes that the second result is more accurate than the first, and choses it in Step 67. If the timeout occurs in Step 65 before receiving a second result, the chooser chooses the first result in Step 66 as the basis for creating a response.

If the score is below the low threshold, the embodiment ignores the associated result in Step 68. The chooser proceeds to set a pre-configured timeout in Step 69, and does not base the timeout duration on a function of the score. Upon receiving a second result before the timeout occurs in Step 610, the chooser chooses the second result in Step 67 regardless of the associated score. In another embodiment, if the score associated with the second result is below a low threshold for the second score, the chooser may produce no useful response and signals an error. If the timeout occurs in Step 610 before receiving a second result, the embodiment produces no useful response and signals an error in Step 611.

If the embodiment of FIG. 6 chooses the second result, it is because the second recognizer produced a result that the first recognizer could not. This is typically because the second recognizer has a larger vocabulary or more accurate language or acoustic model. Upon choosing the second result in Step 67, the embodiment proceeds to update the first recognizer in Step 612 with vocabulary, language, and acoustic models from the second recognizer.

Some embodiments use multiple similar recognizers. Some embodiments use different kinds of recognizers. Some embodiments with different kinds of recognizers perform a step of normalizing scores from different recognizers before comparing the scores to thresholds or to scores from other recognizers. Scores are most often scalar. Various embodiments represent scores on linear, logarithmic, or other scales. Various embodiments base scores on hypothesis probability calculations of phonemes, phonetic sequences, n-grams, word sequences (such as transcriptions), grammatically correct sentences (such as parses), and recognized interpretations of utterances according to domains of knowledge. Some embodiments combine two or more ways of computing scores into a single scalar score. Some embodiments use multi-dimensional scores based on retaining two or more ways of computing scores.

Figure 7A:
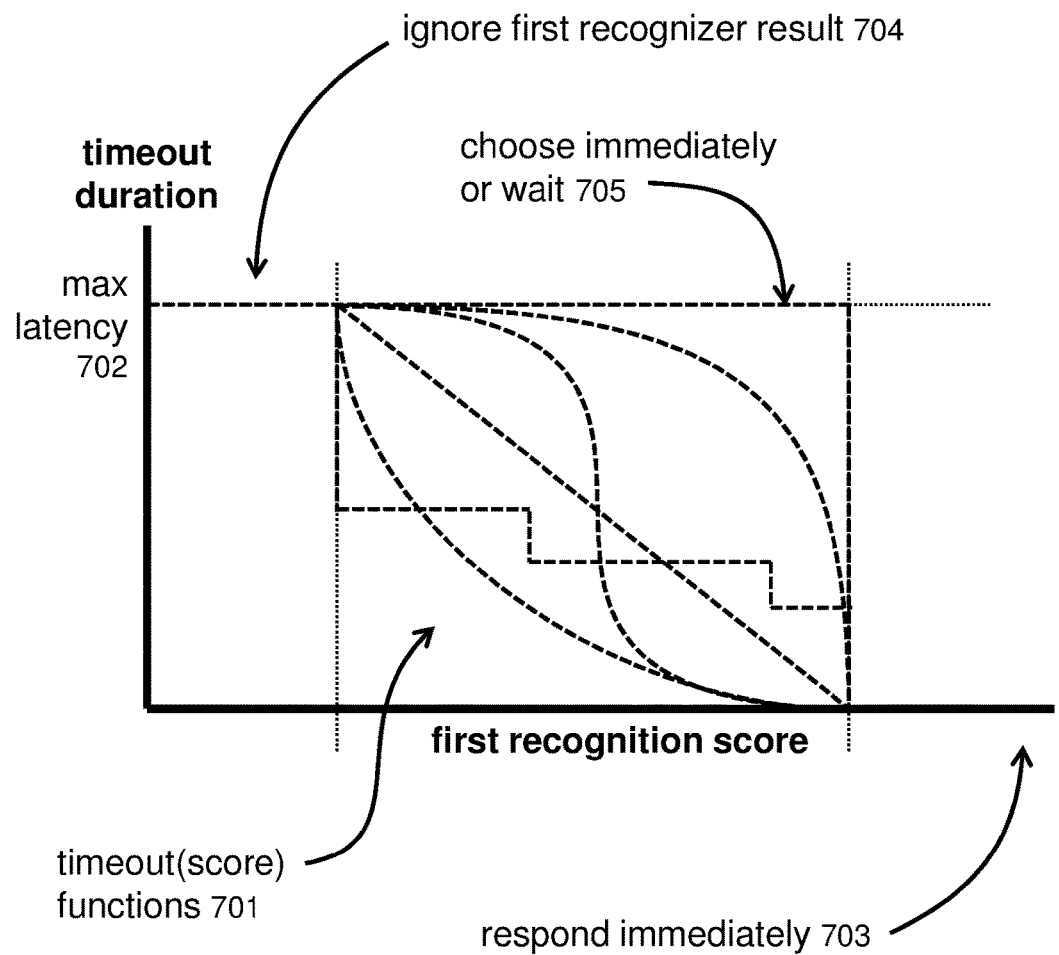
FIG. 7A illustrates several ways to set a timeout duration as a function of a first recognition score, according to some embodiments.

FIG. 7A shows curves for six possible functions 701 used to set a timeout duration, given a first recognition score. All curves lie below a maximum allowable latency 702. In range

703, first recognition scores are above a high threshold, and so the embodiment immediately chooses the first result without waiting for another. In some embodiments, the high threshold is the maximum possible first recognition score, so that the chooser always waits for a second response for some time. In range 704, first recognition scores are below a low threshold, so the chooser ignores the first recognizer result and the timeout duration for receiving a response from the second recognizer is set to the maximum latency 702. If no second result arrives before the timeout occurs, the chooser produces no useful response and signals an error. In some embodiments, the low threshold is the minimum possible first recognition score (e.g. 0), so that the embodiment never ignores the first result as a possible basis for a response, even if the first result is extremely low scoring.

Various curves 701 take different shapes such as linear, parabolic, s-shaped, and staircase. All curves 701 are non-increasing, and most are decreasing, or step-wise decreasing.

Figure 7B:
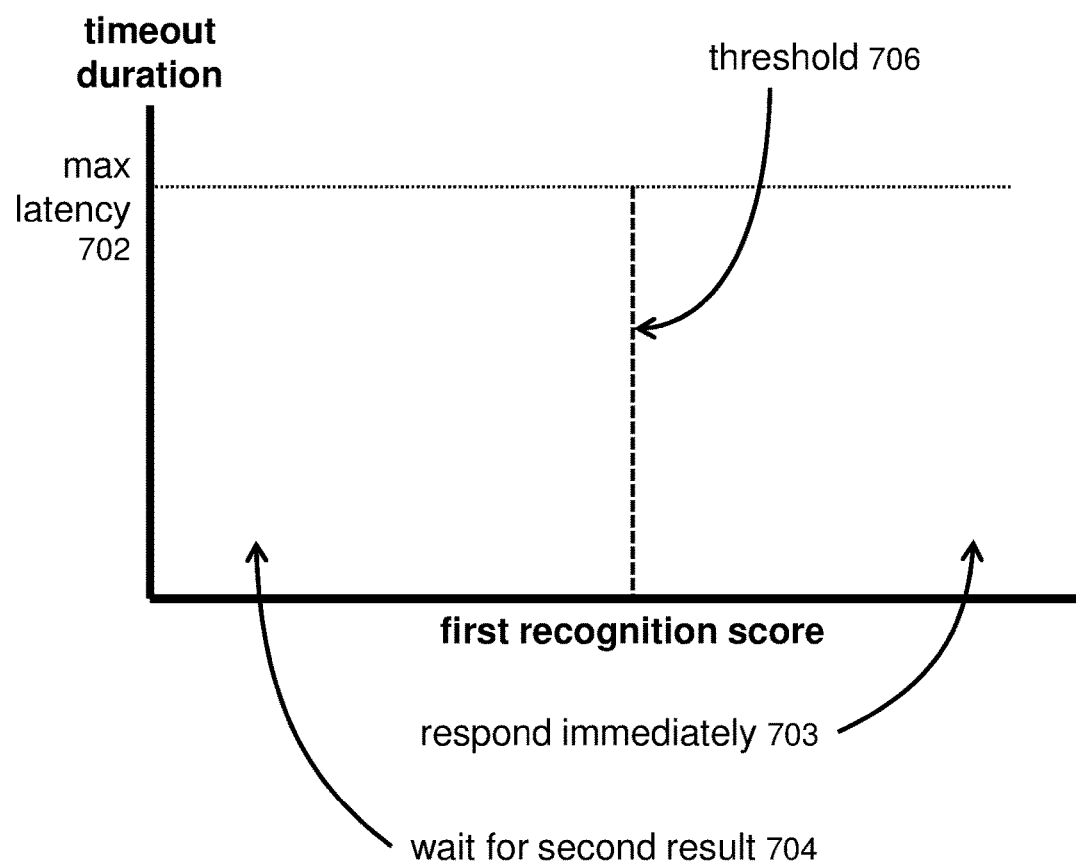
FIG. 7B illustrates choosing immediately or waiting for a second result as a function of a first recognition score, according to some embodiments.

FIG. 7B illustrates an embodiment that waits for a second response unless the score of the first result exceeds a threshold. The dashed line of curve 705 indicates the timeout value as a function of the first recognition score. For low values of the first recognition score, the timeout duration is set to a maximum latency value 702. When the first recognition score exceeded the high threshold 710, then the chooser immediately chooses the first result without waiting for another result, and the embodiment responds without waiting for a second result. This is the behavior illustrated in FIG. 4.

Some embodiments compute a recognition score, not directly from a hypothesis strength within a recognizer, but as a probability of a second recognition score being above a threshold of desired improvement over the first recognition score. In some embodiments, the improvement threshold changes over time.

As will be apparent to practitioners of the art, descriptions herein can be extended to systems of more than two recognizers. Any plural number of recognizers can be considered in making decisions such as where to send speech, whether to choose a result immediately, discard the result, or wait for another, how to compare scores, and whether to start a timeout timer, and what function of one or more timeout timers to use are

Responding Early to Scores Above a Threshold

Figure 8:
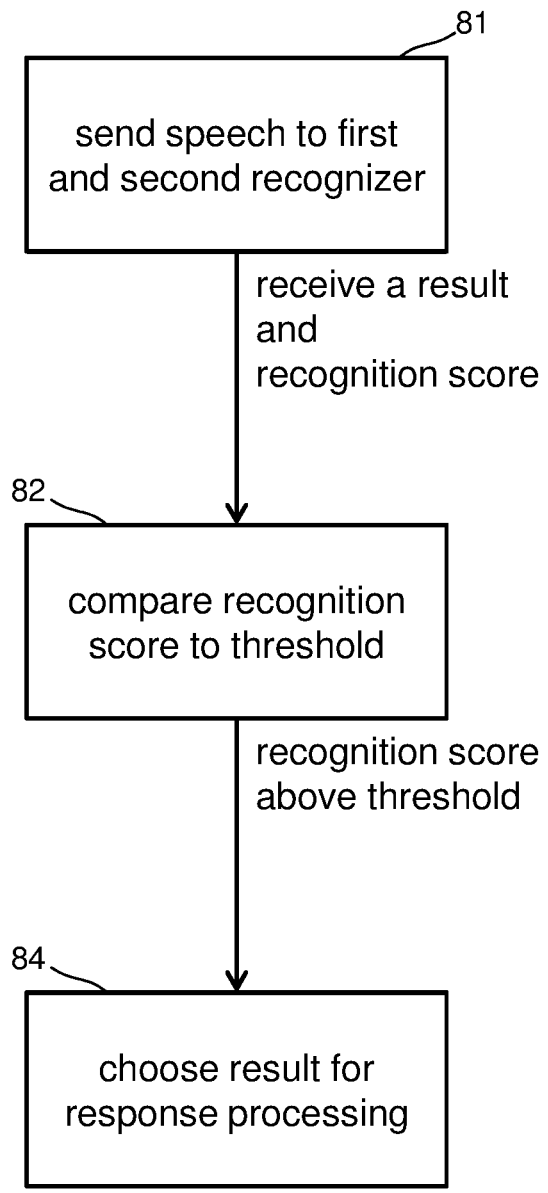
FIG. 8 illustrates a flow chart of choosing a result when its score exceeds a threshold, according to some embodiments.

FIG. 8 shows a flow chart of choosing a result on which to base a response. Speech is sent to both first and second recognizers at substantially the same time in step 81. Next, the chooser receives a result and recognition score from one of the recognizers, and in step 82 compares the recognition score to a threshold. As mentioned earlier, different thresholds may be used depending on which recognizer produced the received recognition score, or the same threshold may be used for scores received from either of the recognizers. When the same threshold is used, the score may be normalized before comparing against the threshold. When the recognition score exceeds the appropriate threshold, the chooser chooses the result for response processing in step 84. This is useful in embodiments for which latency is important, and the fastest response possible is desirable, as long as it meets a minimum desirable quality. Many variations are possible of systems with such behavior.

Figure 9:
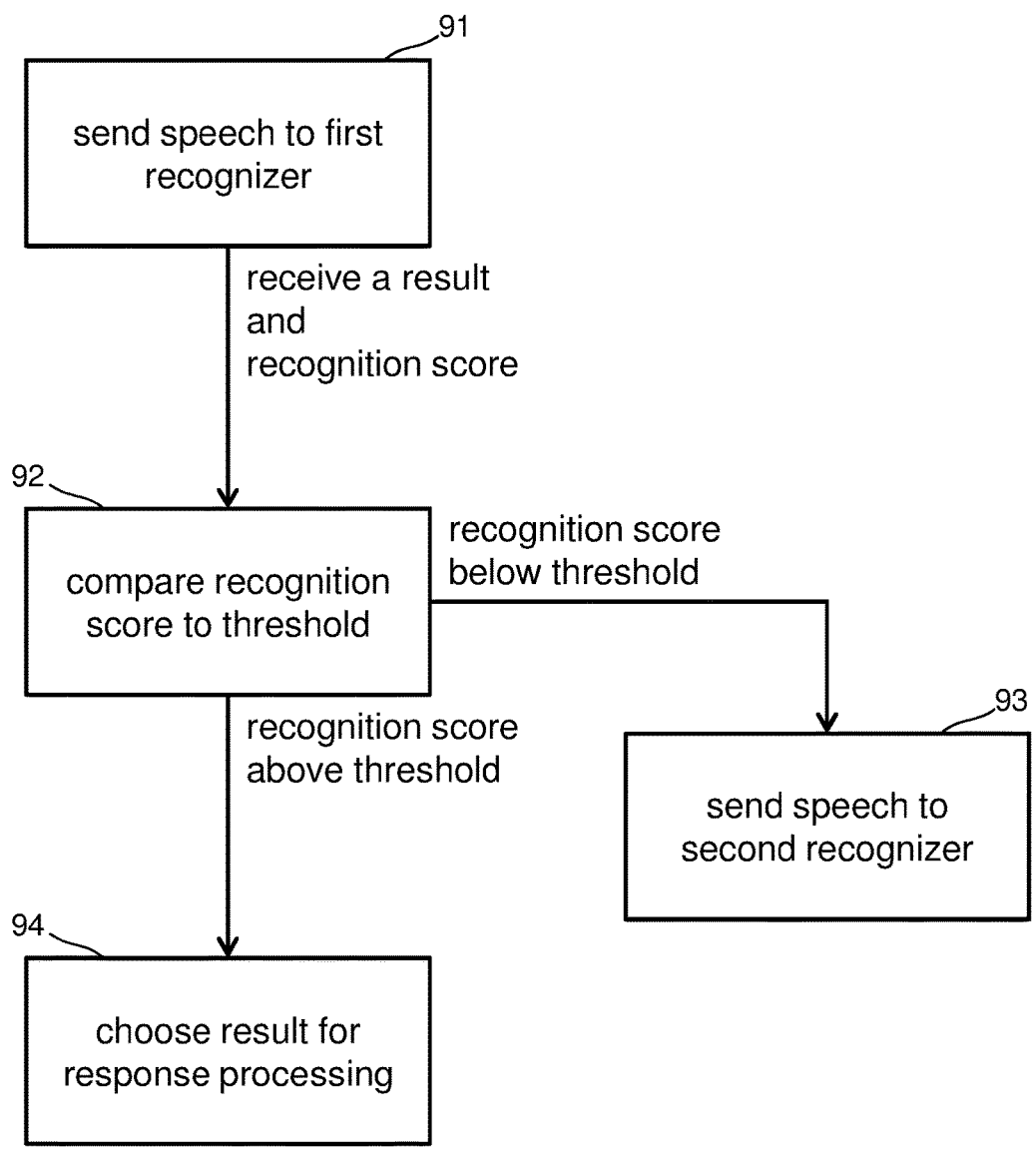
FIG. 9 illustrates a flow chart of choosing a first result if its score exceeds a threshold, and otherwise, sending speech to a second recognizer, according to some embodiments.

FIG. 9 shows a flow chart of a specific embodiment of the flow depicted in FIG. 4 in which a request to the second recognizer is not sent until after receiving a result from the first recognizer. The system begins by sending speech to a first recognizer, but not a second recognizer in step 91. Next, the chooser receives a result and recognition score from the first recognizer, and in step 92 compares the recognition score to a threshold. If the recognition score exceeds the threshold, the embodiment chooses the result for response processing in step 94. If, in step 92, the recognition score does not exceed the threshold, only then does the embodiment send the speech to the second recognizer in step 93. This is useful in embodiments for which first recognizers operate fast enough to avoid significant latency, and for which transmission or processing costs for the second recognizer are high. Many variations are possible of systems with such behavior.

Timeout as a Function of Score

Figure 10:
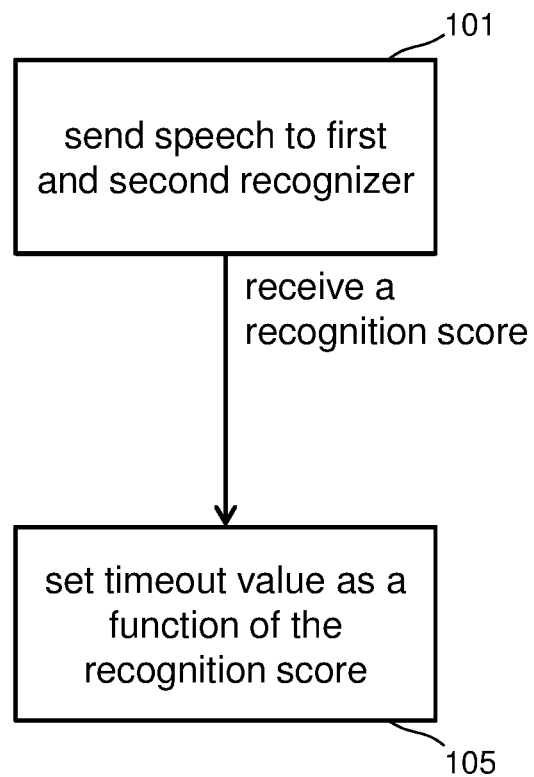
FIG. 10 illustrates a flow chart of setting a timeout duration as a function of a recognition score, according to some embodiments.

FIG. 10 shows a flow chart of a specific embodiment. It begins by sending speech to a first and second recognizer in step 101. Next, the embodiment receives a result and recognition score from one of the recognizers, and in step 105 sets a timeout duration as a function of the recognition score. This is useful in embodiments that define a specific function of tradeoffs between the lower latency of a first response and the potential incremental quality improvements of a second response. Many variations are possible of systems with such behavior.

Figure 11:
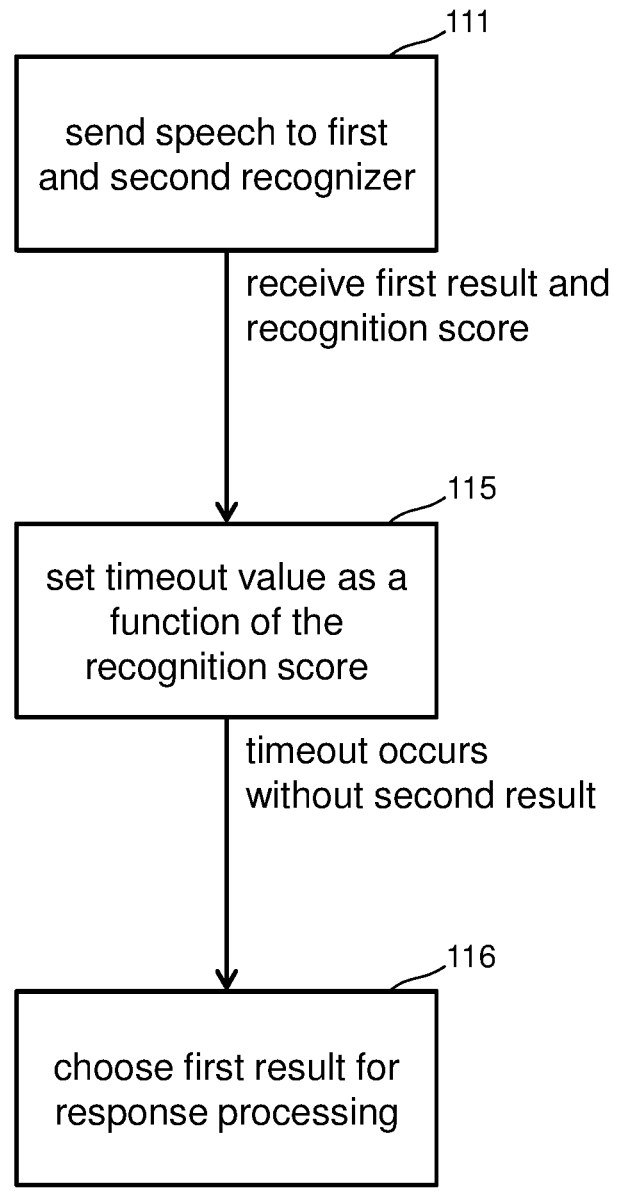
FIG. 11 illustrates a flow chart of setting a timeout duration as a function of a recognition score and choosing a first result if a second result is not received before the timeout occurs, according to some embodiments.

FIG. 11 shows a flow chart of a specific embodiment. It begins by sending speech to a first and second recognizer in step 111. Next, the embodiment receives a result and recognition score from one of the recognizers, and in step 115 sets a timeout duration as a function of the recognition score. If a timeout occurs before receiving a second result, the embodiment chooses the first result for response processing in step 116. Many variations are possible of systems with such behavior.

Real-time Transcription

Some embodiments operate on continuous speech. Such embodiments, on an effectively continuous basis, re-compute or adjust recognition scores and start or disable new timeout timers. Some such embodiments have multiple timers that run simultaneously. In various embodiments, continuous operation effectively means repeating operations on a timescale that is imperceptible to users, such as less than a few hundred milliseconds.

Some such embodiments are systems that display a continuously updated transcription as a user speaks. It is desirable to update the transcription within a certain maximum latency, and as soon as possible if the accuracy is sufficient. If a recognition score from a faster, but less accurate, recognizer exceeds a threshold, then the system updates the transcription with that recognizer's result. If the score does not exceed the threshold then the system waits for a response from a more accurate, but slower, recognizer. Some such embodiments repeatedly send speech to both recognizers and start timers every 10 milliseconds, expecting new results with a latency of 30 to 500 milliseconds. Accordingly, the system will have multiple timers running simultaneously and can switch between the results of one recognizer and the other on any frame boundary.

Some embodiments tend to favor local recognition results for real-time transcriptions, but choose more accurate, remotely-processed results of delimited spoken utterances as the basis for responses. Some embodiments that process delimited spoken utterances only respond to complete commands; automobiles, vending machines, humanoid robots, and some personal assistants may depend on such embodiments.

Physical Implementations

Dual mode speech recognition, as described herein, is embodied in methods, in machines, and in computer-readable media that store code that, if executed by one or more computer processors, would cause the computer processors to perform speech recognition accordingly.

Some embodiments are implemented in modular ways, and various such embodiments use combinations of hardware logic modules and software function modules. Various modular embodiments perform different necessary functions within different comparable modules. For example, some embodiments have a module for receiving speech from a user, sending speech to a first recognizer, a module for sending speech to a second recognizer, a module for receiving a recognition score, and a module for detecting a timeout, and a module for updating a speech recognition vocabulary.

Figure 12:
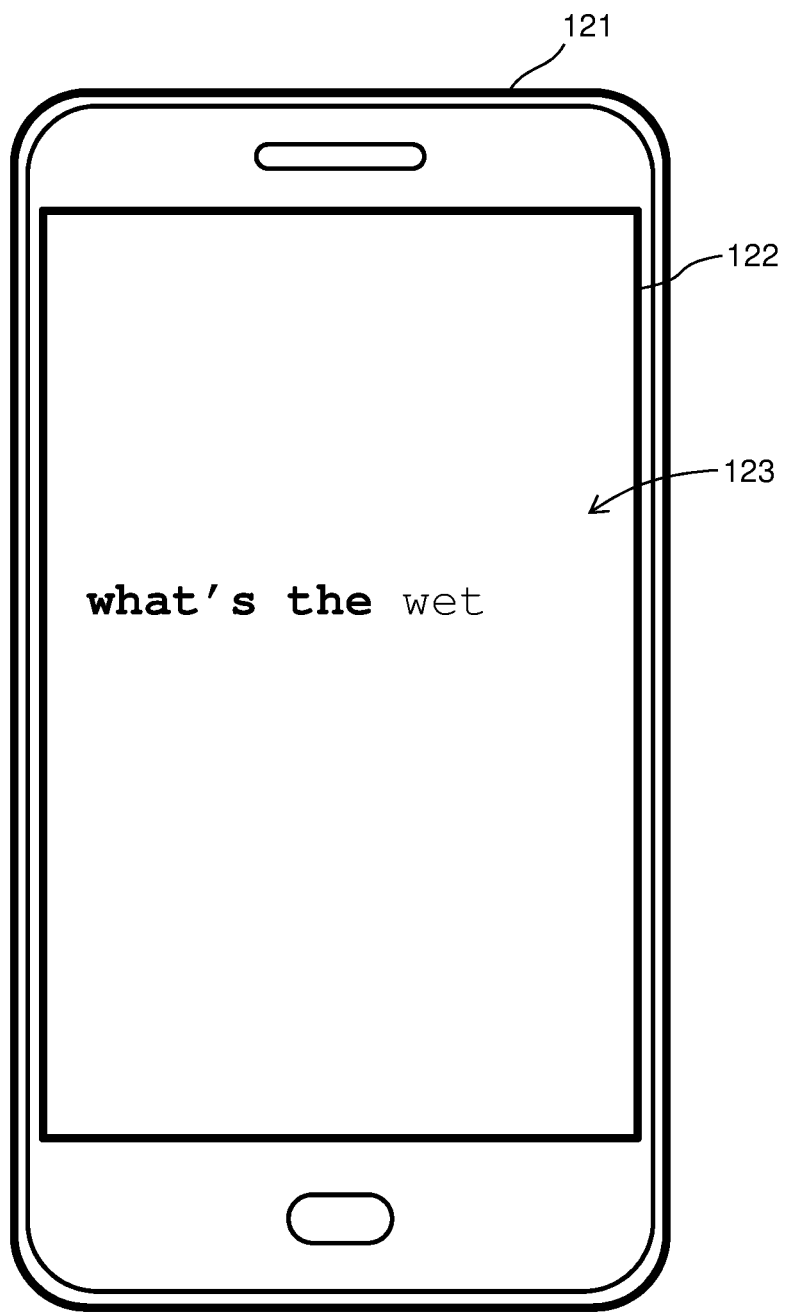
FIG. 12 illustrates a mobile phone embodiment.

FIG. 12 shows an embodiment that is a mobile phone 121 with a display 122 that shows a live transcription as text 123. The embodiment is shown in a scenario of live transcription of speech for the utterances, "what's the weather?", at about ¾ of the way through the utterance. The recognition scores is a transcription hypothesis score, which is above a threshold and, therefore, causes the transcription text to update.

Figure 13:
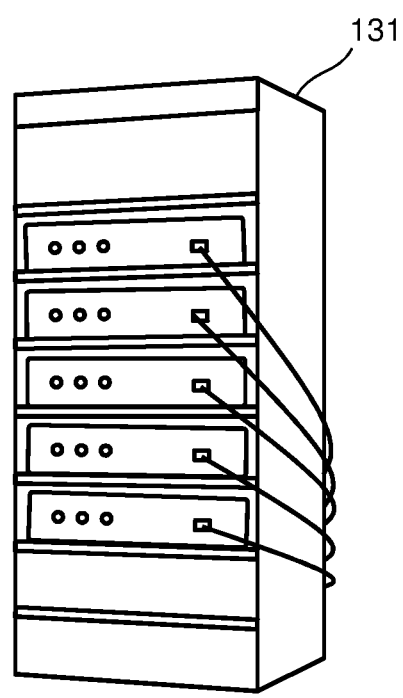
FIG. 13 illustrates a server embodiment.

FIG. 13 shows an embodiment that is a rack of server processors 131. Each server processor is connected to the Internet, and runs software that instructs the server to receive utterances from remote devices, perform recognition, and send recognition scores and results to the remote devices.

Figures 14A, 14B:
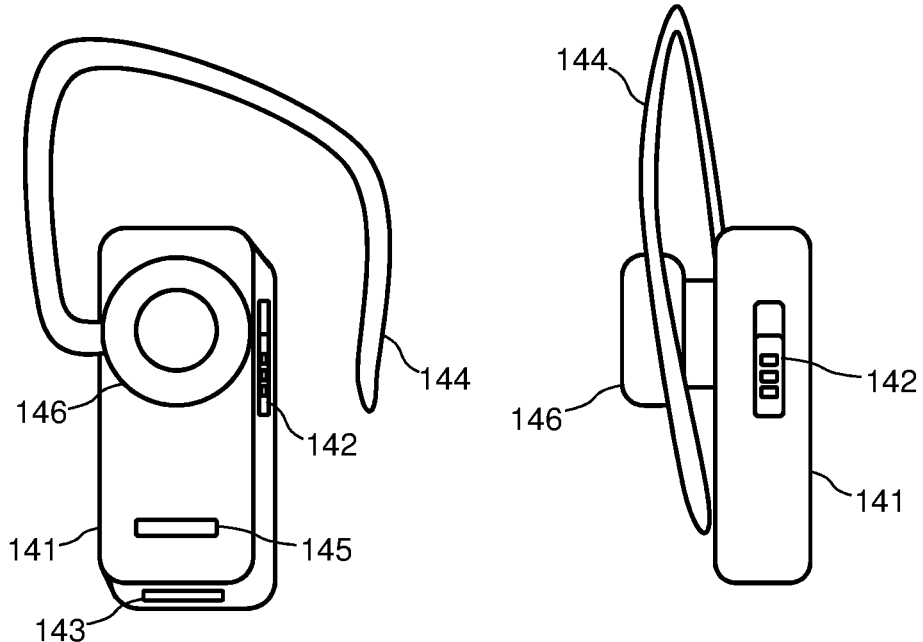
FIG. 14A-14C illustrates an earpiece headset embodiment.
Figure 14C:
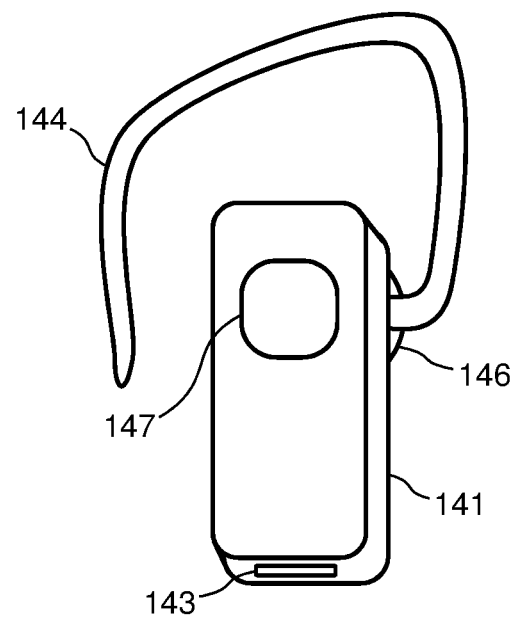

FIG. 14A shows a first view of a speech recognition earpiece 141. It comprises a power switch 142 to turn the device on and off; a battery charging port 143 to allow charging an internal batter; an ear hook 144 that can suspend the device comfortably over a user's ear; a microphone slot 145 for receiving speech; and a speaker 146 for providing spoken responses to the user. FIG. 14B shows a second view of the speech recognition earpiece 141 in which power switch 142, ear hook 144, and speaker 146 are visible. FIG. 14C shows a third view of the speech recognition earpiece 141 in which battery charging port 143, ear hook 144, and speaker 146 are visible. Also visible is mode button 147, which is allows a user to enable and disable speech recognition.

Figure 15A:
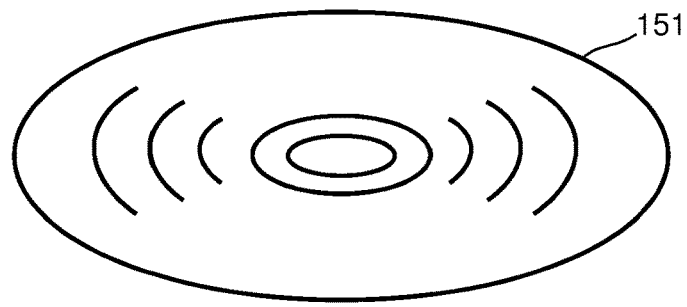
FIG. 15A-15B illustrates non-transitory computer readable media embodiments.
Figure 15B:
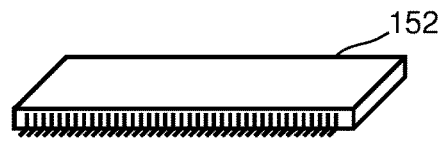

FIG. 15A shows a non-transitory computer readable medium, which is a magnetic computer disk 151. It stores code that, if executed by one or more processors, would cause the processors to perform dual mode speech recognition according to an embodiment. Magnetic computer disks are commonly used to store code for server processors. FIG. 15B shows a non-transitory computer readable medium, which is a Flash random access memory (RAM) chip 152. It stores code that, if executed by one or more processors, would cause the processors to perform dual mode speech recognition according to an embodiment. Flash memory is commonly used both in data centers and in mobile devices to store code for processors in system-on-chip devices. Practitioners will recognize that all computer-readable media, except for propagating signals, are possible embodiments.

Figure 15C:
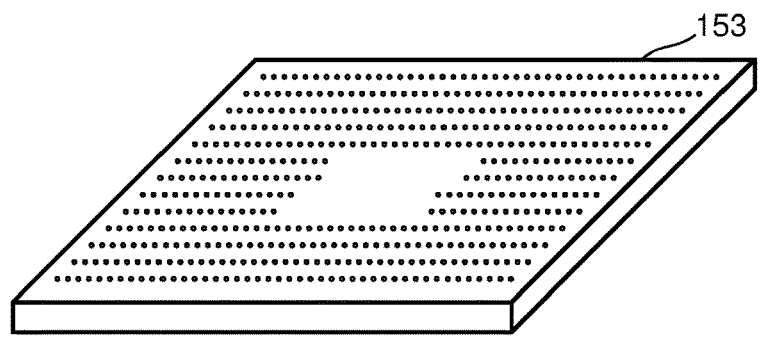
FIG. 15C-15D illustrates a computer chip embodiment.
Figure 15D:
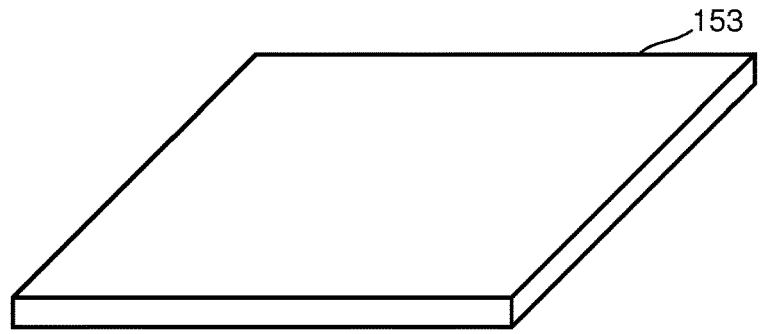

FIG. 15C shows a system-on-chip package 153, with solder balls arranged for surface mounting the package to a printed circuit board within a device. FIG. 15D shows the flat top side of the system-on-chip package 153.

Figure 16:
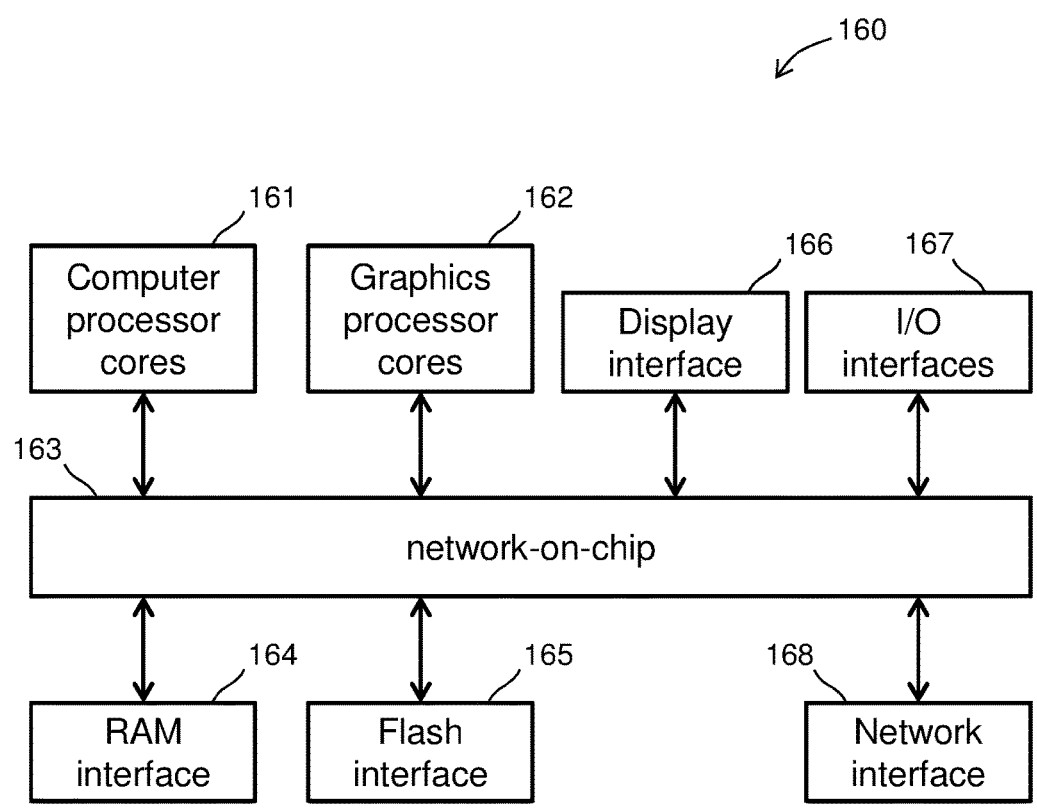
FIG. 16 illustrates a block diagram of a system-on-chip embodiment.

FIG. 16 shows a block diagram of a system-on-chip 160. It comprises a cluster of computer processor (CPU) cores 161 and a cluster of graphics processor (GPU) cores. The processors are connected through a network-on-chip 163 to an off-chip dynamic random access memory (DRAM) interface 164 and Flash interface 165. System-on-chip 160 also has a display interface 166 and I/O interface module 167 coupled to the memory interfaces. The I/O interface enables touch screen interfaces, microphones, speakers, and USB devices, such as keyboards and mice, among others, to access the memory interfaces. System-on-chip 160 also comprises a network interface 168 to allow the processors to access the Internet through wired or wireless connections. By executing instructions stored in RAM devices through interface 164 or Flash devices through interface 165, the CPUs 161 and GPUs 162 perform dual mode speech recognition according to an embodiment.

Figure 17:
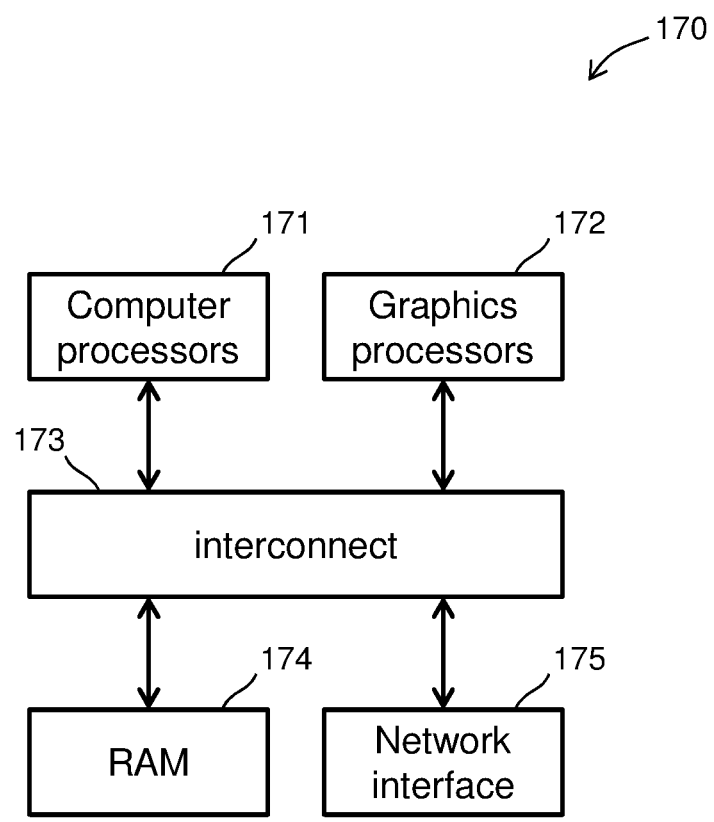
FIG. 17 illustrates a block diagram of a server system embodiment.

FIG. 17 shows a block diagram of a server system 170. It comprises an array of CPUs 171 and an array of GPUs 172 connected through a board-level interconnect 173 to a RAM 174 and network interface 175. By executing instructions stored in RAM 174, the CPUs 171 and GPUs 172 perform dual mode speech recognition according to an embodiment.

What is claimed is:

1. A speech recognition method comprising:
sending speech to a first recognizer and a second recognizer;
receiving, from the first recognizer, a first result associated with a recognition score;
setting a value of a timeout duration as a function of a value of the recognition score, such that the value of the timeout duration is set, in dependence upon the value of the recognition score, from at least one of a maximum value, an intermediary value and a minimum value;
responsive to receiving no result from the second recognizer before the timeout duration expires, choosing the first result as a basis for creating a response; and
responsive to receiving a second result from the second recognizer, updating a speech recognition vocabulary of the first recognizer to include at least one of an updated vocabulary model, an updated language model and an updated acoustic model.

2. The method of claim 1, wherein the first recognizer and the second recognizer are local.

3. The method of claim 1, wherein the first recognizer and the second recognizer are remote.

4. The method of claim 1, wherein the speech is a continuous audio stream.

5. The method of claim 1, wherein the speech is a delimited spoken query.

6. The method of claim 1, wherein the recognition score is based on a phonetic sequence score.

7. The method of claim 1, wherein the recognition score is based on a transcription score.

8. The method of claim 1, wherein the recognition score is based on a grammar parse score.

9. The method of claim 1, wherein the recognition score is based on an interpretation score.

10. A non-transitory computer readable medium storing code that, when executed by one or more computer processors, causes the one or more computer processors to:
send speech to a first recognizer and a second recognizer;
receive, from the first recognizer, a first result associated with a recognition score;

set a value of a timeout duration as a function of the value of the recognition score, such that the value of the timeout duration is set, in dependence upon the value of the recognition score, from at least one of a maximum value, an intermediary value and a minimum value;

responsive to receiving no result from the second recognizer before the timeout duration expires, choose the first result as a basis for creating a response; and responsive to receiving a second result from the second recognizer, updating a speech recognition vocabulary of the first recognizer to include at least one of an updated vocabulary model, an updated language model and an updated acoustic model.

11. A mobile device enabled to perform dual mode speech recognition, the device comprising:
   a module for receiving speech from a user;
   a module for sending speech to a first recognizer;
   a module for sending speech to a second recognizer;
   a module for receiving a recognition score corresponding to recognition by the first recognizer;
   a module for detecting a timeout based on a timeout duration, a value of the timeout duration being selected as a function of the value of the recognition score, such that the value of the timeout duration is set in dependence upon the value of the recognition score, from at least one of a maximum value, an intermediary value and a minimum value; and
   responsive to receiving a second result from the second recognizer, updating a speech recognition vocabulary of the first recognizer to include at least one of an updated vocabulary model, an updated language model and an updated acoustic model,
   wherein the mobile device chooses a first result from the first recognizer if it does not receive a result from the second recognizer before the timeout occurs.

12. The mobile device of claim 11 wherein the first recognizer is local to the device and the second recognizer is remote from the mobile device.

13. The method of claim 1, wherein the function is selected from a set of functions consisting of a linear function, a parabolic function and an s-shaped function.

14. The method of claim 1, wherein the function is not a step function.

15. A speech recognition method comprising:
   continuously sending speech to both (i) a first recognizer for first recognition of the speech and (ii) a second recognizer for second recognition of the speech;
   receiving, from the first recognizer, a first speech recognition result and an associated first recognition score;
   responsive to the first recognition score being above a threshold, choosing the first speech recognition result from the first recognizer as a basis for creating a response to the speech and responsive to the first recognition score being below the threshold, waiting a predetermined period to receive a second speech recognition result and an associated second recognition score from the second recognizer;
   receiving, from the second recognizer, the second speech recognition result and the second recognition score; and
   responsive to receiving the second speech recognition result and the second recognition score, choosing one of the first speech recognition result and the second speech recognition result, in dependence upon the first recognition score and the second recognition score,
   wherein the first recognition of the speech by the first recognizer and the second recognition of the speech by the second recognizer are continuous, and
   wherein the first recognition score and the second recognition score are recomputed and adjusted on a continuing basis by the first recognizer and the second recognizer as the speech continues to be sent to both the first recognizer and the second recognizer, such that the first recognition score and the second recognition score are continuously updated as new and continuous speech is recognized and until an end of the first recognition of the speech and the second recognition of the speech.

16. The method of claim 15, further comprising:
   responsive to the first recognition score being below a low threshold, ignoring the first speech recognition result; and
   responsive to not receiving a second response before a timeout occurs, signaling an error.

17. The method of claim 15, wherein the first recognizer and the second recognizer are local.

18. The method of claim 15, wherein the first recognizer and the second recognizer are remote.

19. The method of claim 15, wherein the speech is a delimited spoken query.

20. The method of claim 15, wherein the first recognition score is based on a phonetic sequence score.

21. The method of claim 15, wherein the first recognition score is based on a transcription score.

22. The method of claim 15, wherein the first recognition score is based on a grammar parse score.

23. The method of claim 15, wherein the first recognition score is based on an interpretation score.

* * * * *